United States Patent [19]

Scott et al.

[11] Patent Number: 4,672,667
[45] Date of Patent: Jun. 9, 1987

[54] METHOD FOR SIGNAL PROCESSING

[75] Inventors: Brian L. Scott; John M. Newell, both of Denton, Tex.

[73] Assignee: Scott Instruments Company, Denton, Tex.

[21] Appl. No.: 500,548

[22] Filed: Jun. 2, 1983

[51] Int. Cl.[4] ................................................ G10L 5/00
[52] U.S. Cl. ....................................................... 381/41
[58] Field of Search .................................... 381/29–53; 364/513, 513.5, 604, 728

[56] References Cited

U.S. PATENT DOCUMENTS 4,161,033  7/1979  Martinson ............................ 364/728
4,388,491  6/1983  Ohta et al. ............................ 381/49

OTHER PUBLICATIONS

Flanagan, Speech Analysis Synthesis and Perception, Second Edition, Springer Verlag 1972, pp. 192-199.

Primary Examiner—E. S. Matt Kemeny
Attorney, Agent, or Firm—Harold E. Meier

[57] ABSTRACT

A method and apparatus for processing a signal to extract selected information therefrom is provided. According to the method, an input signal is converted into a sequence of data samples, and these data samples are applied sequentially through a convolver having first and second sections, the output of the first section forming the input of the second section. A data sample in the second convolver section is then compared to each data sample in the first convolver section to produce an output signal of a plurality of data points, each of the data points representative of a midpoint position within the convolver between a pair of compared data samples. This comparison step is repeated for each data sample in the second convolver section and the output signals form a histogram from which the selected information is extracted. This method may be advantageously utilized in a speech recognition process for extracting various features from an input speech signal.

21 Claims, 10 Drawing Figures

METHOD FOR SIGNAL PROCESSING

TECHNICAL FIELD

The present invention relates to signal processing techniques and more particularly to a method and apparatus for convolving a periodic signal with itself to produce a histogram to provide information about the periodic signal.

BACKGROUND OF THE INVENTION

Signal processing techniques for estimating characteristic parameters of a signal or for transforming a signal into a more desirable form are well known. Such techniques are advantageously utilized in such diverse fields as acoustics, data communications, radar and speech recognition. For example, in a speech recognition system, a speech signal is processed to extract characteristic information encoded in frequency, amplitude and time. This information is then processed to extract various recognizable features in the speech signal which are used to aid in the recognition process. Since the performance of the overall speech recognition system is largely dependent on the accuracy of the original extraction process, highly efficient signal processing techniques are required. Although prior art signal processing techniques have generally proven effective, there is a need for more efficient and powerful techniques to improve overall system performance.

SUMMARY OF THE INVENTION

The present invention relates to a method and apparatus for signal processing. In accordance with the invention, a periodic signal is convolved with itself to produce a histogram from which selected information about the periodic signal is extracted. In a first embodiment, the signal processing technique comprises the steps of converting an input signal into a sequence of data samples, and applying the sequence of data samples sequentially through a convolver having first and second sections, the output of the first section forming the input of the second section. A position of a data sample in the second convolver section is then compared with the position of each data sample in the first convolver section to produce an output signal having a plurality of data points, each of the data points representative of a midpoint position within the convolver between a pair of compared data samples. This comparison step is then repeated for each data sample in the second convolver section and the output signals from each set of comparisons form a historgram from which the selected signal information is extracted.

If the input signal is periodic or has portions with periodic components, then the method of convolution described above produces several clusters of symmetrical patterns in the convolver sections which are then represented in the historgram. Conversely, if the signal is not periodic, or has a period greater than the time represented by the convolver length, no clusters of symmetrical patterns are produced. The changes in the histogram over time indicate various characteristics of the input signal, such as periodicity and pitch.

In an alternate embodiment of the present invention, the method comprises the steps of converting the input signal into a sequence of data samples, and applying the sequence of data samples sequentially through a convolver having first and second sections, each of the convolver sections having an entrance and an exit, the exit of the first convolver section forming the entrance of the second convolver section. The data samples at the first and second section exits, respectively, are then compared with the positions of each data sample in the second and first sections, respectively, to produce a pair of output signals each having a plurality of data points, each of the data points representative of a midpoint position within the convolver between a pair of compared data samples. The output signals produced from such comparisons are then subtracted from a historgram from which the selected signal information is extracted. After a new sample is taken into the convolver, the data samples at the first and second section entrances, respectively, are then compared with the positions of each data sample in the second and first sections, respectively, to produce a pair of output signals each having a plurality of data points, the output signals from such comparisons being added to the histogram. This method obviates redundant calculations and thus improves processing efficiency.

According to another feature of the present invention, an apparatus for processing a signal to extract selected information therefrom is provided. This apparatus may be advantageously utilized in a speech recognition system.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figures 1, 2, 6:
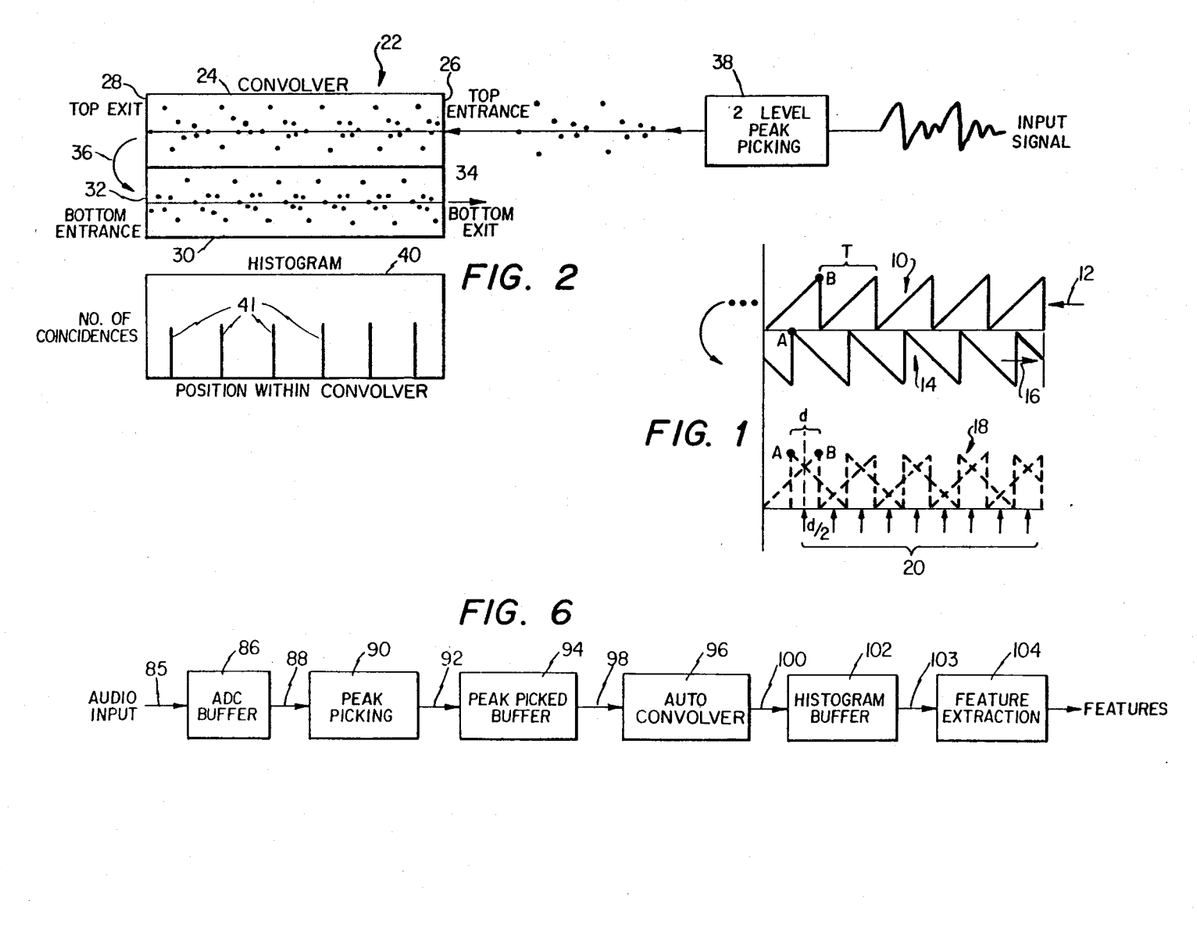
FIG. 1 shows how the method of convolution of the present invention produces a symmetrical signal.
FIG. 2 discloses the convolver structure of the present invention having first and second sections through which the input signal is sequentially passed.
FIG. 6 is a block diagram of an apparatus for use in a speech recognition system.

Referring now to the drawings wherein like reference characters designate like or similar parts throughout the several views, FIG. 1 shows the convolution of a periodic signal with itself in accordance with the method of the present invention. More specifically, a periodic sawtooth waveform having a period T has a first portion 10 located within the graph boundaries. The portion 10 of the sawtooth waveform is moving from right to left as designated by the arrow 12. The periodic sawtooth waveform also includes a second portion 14 which is moving from left to right through the graph boundaries as designated by the arrow 16. The second portion 14 of the periodic sawtooth waveform represents essentially a "mirror-image" of the first portion 10 of the periodic sawtooth waveform, except that the second portion 14 has been folded over so as to move the opposite direction. If the first portion 10 and the second portion 14 of the periodic sawtooth waveform are mixed as shown in graph 18, then a plurality of nodes 20 are produced. As can be seen in FIG. 1, the waveform resulting from the mixing of the first portion 10 and the second portion 14 of the periodic sawtooth waveform is symmetric about each of the nodes 20.

The method of convolution shown in FIG. 1, wherein a periodic signal is convolved with itself to form a symmetrical pattern, forms the theoretical basis of the present invention. This method can be better understood by considering specific data points in the periodic sawtooth waveform. Referring back to FIG. 1, the second portion 14 of the periodic sawtooth waveform has a data point A as shown. Likewise, the first portion 10 of the periodic sawtooth waveform includes a data point B which has the same absolute magnitude as the magnitude of data point A. During the movement of the first and second portions of the periodic sawtooth waveform through the graph boundaries, the points A and B will be separated by a distance d. The midpoint of this distance, d/2, represents the point within the graph boundaries at which data points A and B will subsequently coincide in time. More specifically, the midpoint d/2 represents one of the nodes 20 about which the signal is symmetric. At a subsequent instant in time, data point A will move slightly to the right but data point B will move slightly to the left. Therefore, the midpoint between these data points will remain at exactly the same position within the graph boundaries until either point A or point B exits the boundaries. Eventually, data points A and B will coincide in time at the midpoint itself. If the amplitudes of the first portion 10 and the second portion 14 are differenced at this time, then a zero output is produced since data points A and B have the same absolute magnitude. This method of convolution, wherein a periodic signal is convolved with a "mirror-image" of itself, always produces these nodes in the manner described above. It can be seen from the waveform 18 that the nodes 20 appear at twice the pitch period T. Therefore, if the waveform is perfectly symmetrical, nodes are produced where the signal is correlated at half-pitch period increments.

Referring now to FIG. 2, a practical embodiment of the present invention is shown. In particular, a convolver 22 includes a first section 24 having a top entrance 26 and a top exit 28. The convolver 22 also includes a second section 30 having a bottom entrance 32 and a bottom exit 34. As designated by the arrow 36, the top exit 28 of the first convolver section 24 is connected to the bottom entrance 32 of the second convolver section 30. The first and second convolver sections correspond to the graph boundaries of FIG. 1 through which the periodic sawtooth waveform was passed.

A periodic input signal is applied to the first section 24 of the convolver 22 through a two level peak picking circuit 38. The input signal is a periodic analog signal whose direction is monitored by the peak picking circuit 38. In operation of the peak picking circuit, a peak is defined whenever the direction of the input signal changes. The output of the peak picking circuit 38 is then applied to the top entrance 26 of the first convolver section 24. The portion of the peak-picked signal in the first convolver section 24 corresponds to the first portion 10 of the periodic sawtooth waveform of FIG. 1. Likewise, the portion of the peak-picked signal in the first convolver section 24 corresponds to the first portion 10 of the periodic sawtooth waveform of FIG. 1. Likewise, the portion of the peak-picked signal within the second convolver section 30 corresponds to the second portion 14 of the periodic sawtooth waveform of FIG. 1.

When the signal sequences in the first and second convolver sections are processed according to the method of the present invention, a histogram 40 is produced as will be described in more detail below. The clusters 41 of symmetry represented within the histogram are used to provide information about the periodic input signal. In particular, when the peak-pick data passing through the convolver 22 is periodic, overlaying the incoming side of the convolver with the outgoing side produces several clusters of symmetrical patterns in the convolver sections, since the two sides of the convolver are very near "mirror-images." These patterns are represented in the histogram and changes in the histogram over time represent various characteristics of the input signal, such as periodicity and pitch. By way of example only, the distance between the centers of the clusters equals the period of the fundamental frequency of the signal. Therefore, once this distance is calculated. The fundamental frequency, or pitch of the signal, is readily obtained. The absence of such clusters of symmetry indicates that the signal is not periodic, or has a period greater than the time represented by the length of the first and second sections of the convolver.

Therefore, in accordance with the method of the present invention, a periodic signal is convolved with a "mirror-image" of itself to produce a histogram which provides an indication of the symmetry of the periodic input signal in the convolver. The peaks in the histogram predict where specific data points within the first and second sections of the convolver, respectively, will meet as they pass therethrough. By way of example only, the method of the present invention can be advantageously utilized in a speech recognition system. In such systems, a speech signal is processed to extract characteristic information encoded in frequency, amplitude and time. Such information is then processed to extract various recognizable features in the speech signal which are used to aid in the recognition process. Prior art speech recognition systems often arbitrarily segment the speech signal for processing purposes. This arbitrary segmentation often prevents accurate speech recognition since the various transitions in the speech signal for example, between vowels and consonants, do not occur at arbitrary points therein. Therefore, to improve the accuracy of the speech recognition system, it is desirable to precisely determine where these transitions occur.

Figure 3A:
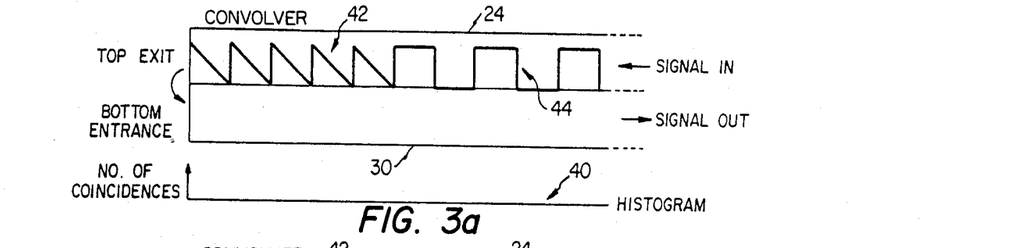
FIGS. 3a–3e show the convolution process of an input signal having distinct periodic waveforms and the histogram which results from this process.
Figure 3B:
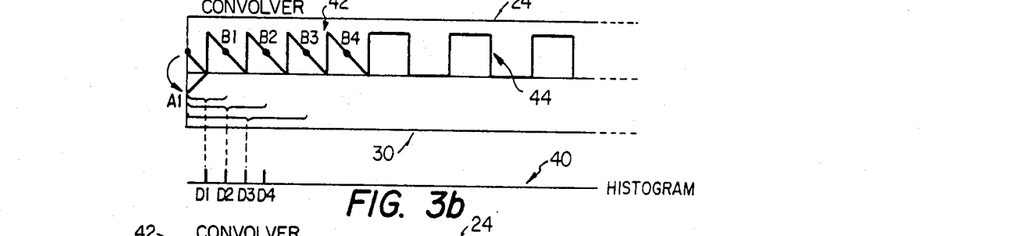

Referring now to FIGS. 3a-3e, it is shown how the method of the present invention is utilized to find the transitions in a speech signal. For purposes of illustration, the input signal in FIG. 3a is deemed to represent the transition in a speech signal between a vowel and a consonant. Referring to FIG. 3a, the vowel portion is represented by the periodic sawtooth waveform 42 while the consonant portion is represented by the periodic square waveform 44. In FIG. 3a, the entire composite input waveform is in the first correlator section 24. Since no portion of this composite signal is in the second convolver section 30, no output is produced in the histogram 40. In FIG. 3b, half a pitch period of the sawtooth waveform 42 is now in the second section 30 of the convolver 22. According to the method of the present invention, points of similar amplitudes are now processed by determining the midpoints therebetween to produce an output signal having a plurality of data points in the histogram 40. In particular, each of the data points is representative of a midpoint position within the convolver the position of a pair of compared data samples. For example, with reference to FIG. 3b, comparing the position of data point A1 in the second section 30 and data point B1 in the first convolver section 24 produces a data point D1 in the histogram 40. Similarly, when data point A1 is processed in this manner with the next data point B2 in the first convolver section 24, a data point D2 is produced in the histogram 40, etc. Therefore, when the amplitude of the signals in the first and second convolver sections are the same, or within a predetermined range, an ordered series of midpoint calculations is performed to produce the output signal having a plurality of data points. After the data point D4 is produced, no more outputs in the histogram are shown for the sake of clarity since the sawtooth portion 42 will not be highly correlated with the squarewave portion 44.

Figure 3C:
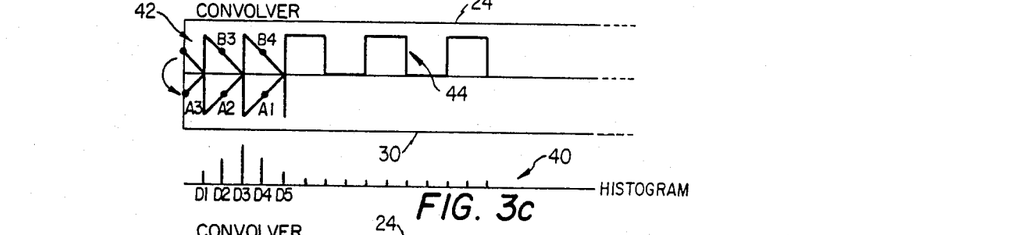

Referring now to FIG. 3c, at a subsequent instant in time, 2½ cycles of the sawtooth portion of the input signal 42 are now in the first section 24 of the convolver, and 2½ cycles are in the second section 30 of the convolver. According to the method of the present invention, the data point A2 is then compared with all data points of the sawtooth waveform in the first convolver section 24 having similar amplitudes. In particular, when the position of data point A2 is compared with the position of data point B4, another "coincidence" occurs at the data point D3 position in the histogram and the histogram is augmented. Data point A2 is also compared with data point B3 in this manner to produce another "coincidence" at the data point D2 position in the histogram. Likewise, the data point A3 is compared with the data points in a first convolver section in the similar fashion to augment the histogram. However, the midpoints from the data point A1 are not recalculated and contributed to the histogram since, as noted above with respect to FIG. 1, these midpoints remain at exactly the same locations along the convolver length until the data point A1 exits the second section.

Figure 3D:
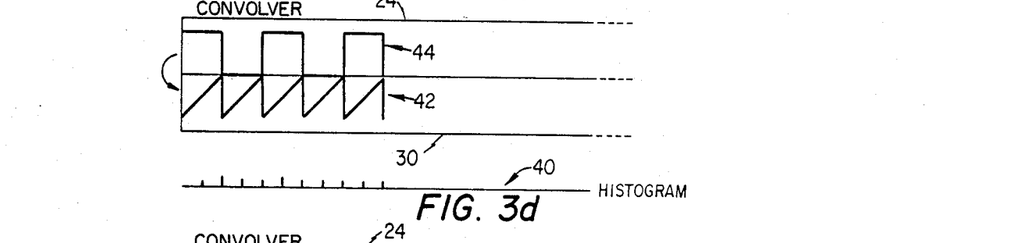
Figure 3E:
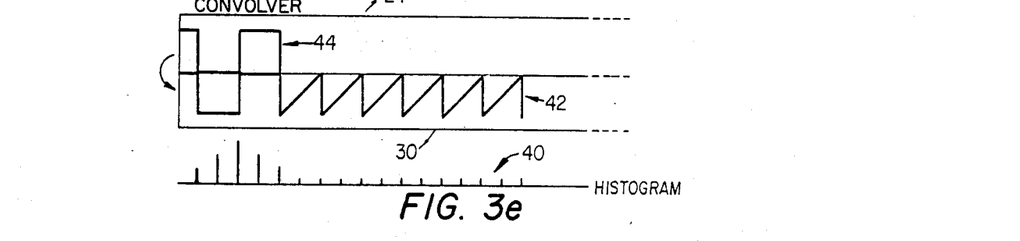

The ordered series of midpoint calculations produces the histogram output shown in FIG. 3c. As can be seen, the histogram output reaches a maximum at data point D3 when exactly half of the sawtooth waveform 42 is in the first section of the correlator, and the other half of the sawtooth waveform 42 is in the second section of the convolver. The peak in the histogram at this point represents the point within the convolver where the maximum amount of convolver data exists for the sawtooth waveform 42. All of the relevant acoustical information in the vowel speech segment has therefore been represented by this isolated picture in the histogram. At a subsequent instant in time, the histogram output will begin to show less correlation since more of the sawtooth waveform will be in the second section of the convolver than the first section. Such a result is shown in FIG. 3d when the sawtooth waveform 42 is entirely in the second section 30 of the convolver and the entire square waveform 44 is in the first section 24 of the convolver. The small amount of output represented in the histogram in FIG. 3 verifies that the two waveforms are not symmetrically located within the correlator section. However, at a subsequent instant in time as shown in FIG. 3e, exactly half of the squarewave 44 is in the first convolver section 24, and half in the second convolver section 30. As in FIG. 3c, the output represented in the histogram again rises to a peak at this time.

If the histogram outputs represented in FIGS. 3a-3e are examined in a sequential fashion, the changes over time in the histogram indicate various characteristics of the input signal. In particular, it can be seen that the histogram output reaches a peak when the sawtooth waveform 42 is highly correlated with itself, then dies down, and then increases again as the square waveform 44 becomes correlated with itself. Therefore, the method of the present invention can be advantageously utilized for speech segmentation, e.g., to segment between a vowel and a consonant, by simply observing the changes in the histogram output. Moreover, as noted above, the distance between clusters of symmetry in the histogram output equals the period of the fundamental frequency of the input signal. As shown in FIGS. 3a-3e, uncorrelated data in the input signal has little or no effect on the histogram. On the other hand, the "pyramid" peaks in histogram show where the maximum amount of correlated data occurs in the various segments of the speech signal. More specifically, these pyramids represent all of the important acoustic information in the relevant speech segment condensed over a specific period of time. Therefore, it can be seen that the convolver effectively integrates only correlated data over such time periods. As data samples are sequentially passed through the convolver sections, the histogram indicates where there is correlated data in the input signal and what this correlated data looks like integrated over time. Since uncorrelated data has little effect on the histogram, the convolver effectively digs the desired signal out of any background noise.

Figure 4:
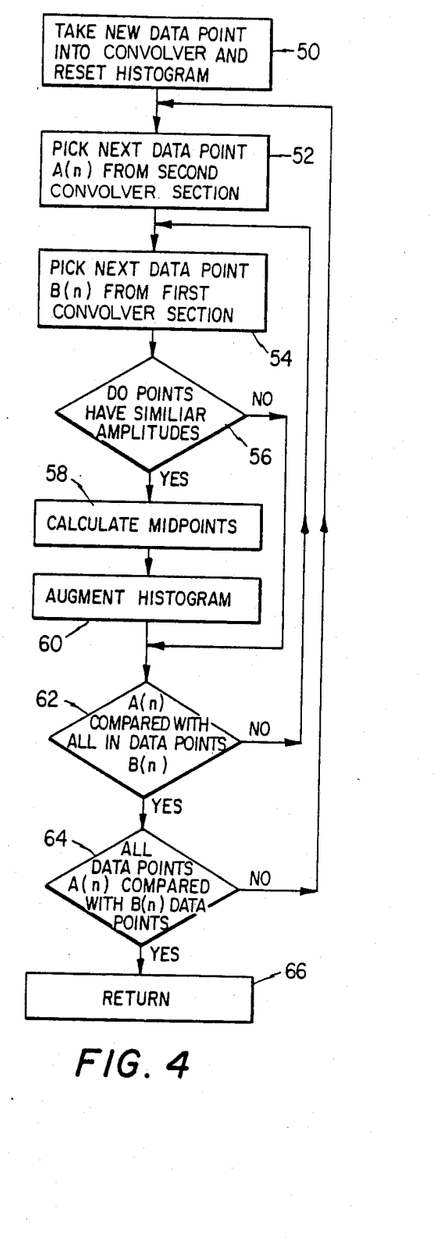
FIG. 4 is a flow chart diagram of a first method of the present invention for producing the histogram.

Referring now to FIG. 4, a flow chart diagram is shown which describes the ordered series of midpoint calculations for producing the histogram. The routine begins at instruction 50 when a new data point enters into the top entrance of the first convolver section 24. At this point, the entire histogram is also set to zero. After instruction 50 is executed, a data point A(n) from the second convolver section is chosen by instruction 52. Similarly, a data point B(n) from the first convolver section is chosen by instruction 54. The data point A(n) and B(n) are chosen from the leftmost portions of the first and second convolver sections 24 and 26. The method then enters the inquiry 56 to determine whether points A(n) and B(n) have similar amplitudes. If not, the method branches forward to inquiry 62. However, if the data points chosen have similar amplitudes, then a midpoint calculation instruction 58 is executed to form a data point in the histogram representative of a midpoint position within the convolver between the positions of the pair of compared data samples. The midpoint coincidence is then reflected in the histogram by the execution of instruction 60. The method then enters inquiry 62 to determine whether the data point A(n) position has been compared with all of the data points B(n) in the first convolver section 24. If not, the method branches back to instruction 54 to pick the next data point B(n) from the first correlator section. The data point A(n) is then compared with the next data point in a similar fashion to augment the histogram if these data points have similar amplitudes.

However, if the data point A(n) position has been compared with all of the positions of the data points B(n), then the method enters inquiry 64 to determine whether all the positions of the data points in the second convolver section have been compared with all positions of the data points in the first convolver section. If not, the method branches back to instruction 52 to pick the next data point A(n) from the second convolver section. However, if all the positions of the data points A(n) in the second convolver section have been compared with all the positions of the data points B(n) in the first convolver section, then the return instruction 66 is executed and the histogram has been formed.

It should be noted that all of the data points in the second convolver section may be correlated with all of the data points in the first convolver section. However, such a technique may be impractical to implement even if digital processing techniques are utilized. Therefore, in accordance with the method of the present invention, the amplitudes of the data points are first compared to see whether these points have amplitudes within a predetermined range. If the points do not have similar amplitudes, then these points are not correlated. Also, it may be desirable to increment the histogram as a function of the amplitude of the data points being compared. For example, the histogram would be incremented to a larger degree if the amplitude of the data points is large compared to a fixed reference. Therefore, data points having small amplitudes, even if highly correlated, would not increment the histogram as much as data points having larger amplitudes. Thus, in a speech recognition system, the method of the present invention would provide emphasis to louder sounds. Finally, the histogram may be incremented to a larger degree depending on where in the convolver the various data points are located.

Figure 5:
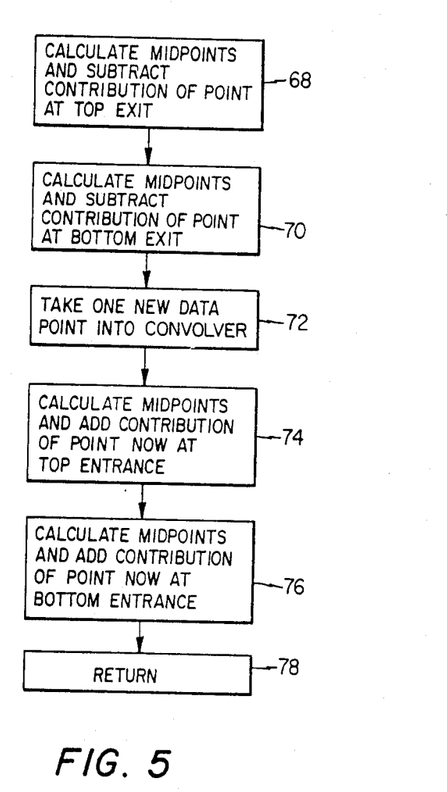
FIG. 5 is a flow chart diagram of an alternate embodiment of the present invention for producing the histogram.

Referring now to FIG. 5, a flow chart for an alternate embodiment of the present invention is shown. As noted above in the discussion of FIG. 1, the midpoint position between the points A(n) and B(n) will remain fixed until one of the compared data points travels outside of the graph boundaries. Given this fact, once the midpoint position has been calculated and the histogram augmented, it is redundant to again calculate the contribution from these two points at a subsequent time since this calculation will produce the exact same midpoint. Therefore, in accordance with the alternate embodiment of the present invention, the entrances and the exits of the first and second convolver sections 24 and 26 are simply monitored to determined when data points enter and exit the convolver sections. When the data point enters a convolver section, the midpoints are calculated and the histogram augmented if the amplitude test is met as described above. However, once this data point exits a convolver section, the midpoint contributions are subtracted from the histogram to reflect that the data point no longer affects the histogram.

Referring now to FIG. 5, the method begins by executing instruction 68 to process whatever data point is present at the top exit 28 of the first convolver section 24. The midpoints with respect to this data point are calculated and the midpoint contributions subtracted from the histogram. The method then continues by executing instructions 70 to process whatever data point is present at the bottom exit 34 of the second convolver section 30. Similarly, the midpoints with respect to this data point are calculated and the midpoint contributions subtracted from the histogram. By executing instruction 72, a new data point is then taken into the first section 24 of the convolver 22. This data point is now compared to the data points in the second section having similar amplitudes by execution of instruction 74. Since this data point is at an entrance, the midpoint contributions are added to the histogram. The method then enters instruction 76 to process the data point now present at the bottom entrance 32 of the second convolver section 30. The midpoints with respect to this data point are calculated and the midpoint contributions added to the histogram. After all data points have been processed, the method executes return instruction 78 and the histogram has been formed.

Therefore, in accordance with the alternate embodiment of the present invention, the four corners of the convolver 22 are monitored. The method then processes whatever data points appear at the exits of the first and second sections, and the midpoint contributions are subtracted from the histogram. However, after a new data point is taken into the convolver, the method processes the data points now at the entrances of the convolver sections and the midpoint contributions are added to the histogram. This method reduces processing time by obviating redundant calculations of the midpoints.

Referring now to FIG. 6, an apparatus for carrying out the signal processing techniques of the present invention is shown in conjunction with a speech recognition system. In particular, the audio input signal is applied via line 85 to an analog-to-digital converter 86 which converts the analog input signal to digital form. The output of the analog-to-digital converter 86 is applied via line 88 to the peak picking circuit 90 as described above which monitors the direction of the signal to determine the peaks therein. The output of the peak picking circuit 90 is then applied via line 92 to a peak-picked buffer 94 for storage. An auto convolver 96, which serves to convolve the signal with a "mirror-image" of itself as described above with respect to FIGS. 1-5, receives the output from the buffer 94 via line 98. The output of the auto convolver on line 100, i.e., the histogram, is stored in the histogram buffer 102 and then applied to a feature extraction circuit 104 via line 103 wherein the various features can be extracted and stored to aid in the speech recognition process. In the preferred embodiment, the apparatus disclosed in FIG. 6 is controlled by a general purpose digital processor. Moreover, if desired, the peak picking circuit 90 and the auto convolver 96 may actually be software functions within the processing system.

In summary, an improved method and apparatus for signal processing has been provided as described above. According to the present invention, an input signal is convolved with itself by an ordered series of midpoint calculations to form a histogram from which selected information about the input signal can be extracted. Since the convolver of the present invention effectively integrates only correlated data over time, only the important information in the input signal is represented. This method may thus be advantageously utilized in the speech recognition process for extracting various features from an input speech signal.

Although the invention has been described and illustrated in detail, it is to be clearly understood that the same is by way of illustration and example only and it is not to be taken by way of limitation. The spirit and scope of this invention are to be limited only by the terms of the appended claims.

We claim:
1. A method for processing a signal to extract selected information therefrom, comprising the steps of:
 (a) converting said signal into first and second sequences of data samples, the first sequence including samples 1 . . . (n/2) and the second sequence including samples (n/2)+1 . . . n and the end of said first sequence forming the beginning of said second sequence;

(b) translating the first sequence in a first direction and the second sequence in a second direction opposite of the first direction such that samples 1 ... (n/2) of the first sequence positionly overlie samples n ... (n/2)+1 of the second sequence;

(c) comparing a position of a data sample in said second sequence to the position of each data sample in said first sequence to produce a plurality of data points, each of said data points representative of a midpoint position between the compared data samples;

(d) repeating step (c) for the position of each data sample in said second sequence; and (e) summing the data points at each midpoint position to form a histogram.

2. The method for processing as described in claim 1 wherein the step of converting comprises converting said signal from an analog form to a digital form.

3. The method for processing as described in claim 1 further including the step of sampling said sequence of data samples to produce a sequence of peak data samples.

4. The method for processing as described in claim 1 wherein symmetrical patterns are represented in said histogram when said signal is periodic.

5. The method for processing as described in claim 4 wherein said symmetrical patterns are separated by a distance equaling the period of the fundamental frequency of said periodic signal.

6. The method for processing as described in claim 1 wherein said midpoint position of the compared data samples is determined by calculating the distance between said compared data samples and dividing by two.

7. The method for processing as described in claim 1 wherein said data samples are compared only if the amplitudes of said data samples are within a predetermined range.

8. The method for processing as described in claim 7 wherein said data points have a value proportional to the amplitudes of said compared data samples.

9. A method for processing a speech signal to extract selected information therefrom, said selected information useful for speech recognition, comprising the steps of:

(a) converting said speech signal into first and second sequences of digital samples, the end of the first sequence forming the beginning of the second sequence;

(b) sampling said first and second sequences of data samples to produce first and second sequences of peak data samples, the first sequence including peak data samples 1 ... (n/2) and the second sequence including peak data samples (n/2)+1 ... n;

(c) translating the first sequence of peak data samples in a first direction and the second sequence of peak data samples in a second direction opposite of the first direction such that samples 1 ... (n/2) of the first sequence positionly overlie samples n ... (n/2)+1 of the second sequence;

(d) comparing a position of a data sample in said second sequence of peak data samples to each data sample in said first sequence of peak data samples to produce a plurality of data points, each of said data points representative of a midpoint position between the compared data samples;

(e) repeating step (d) for the position of each data sample in said second sequence of peak data samples;

(f) summing the data points at each midpoint position to form a histogram.

10. The method for processing a speech signal as described in claim 9 wherein said histogram has symmetrical patterns separated by a distance equaling the period of the fundamental frequency of said speech signal when said speech signal is periodic.

11. The method for processing a speech signal as described in claim 9 wherein the midpoint position is determined by calculating the distance between the compared data samples and dividing by two.

12. The method for processing a speech signal as described in claim 9 wherein said data samples are compared only when the amplitudes of said data samples are within a predetermined range.

13. The method for processing a speech signal as described in claim 12 wherein said data points have a value proportional to said amplitude of said compared data samples.

14. A method for processing a signal to extract selected information therefrom, comprising the steps of:

(a) converting said signal into first and second sequences of data samples, the first sequence including samples 1 ... (n/2) and the second sequence including samples (n/2)+1 ... n, each of the first and second sequences having a beginning and an end, the end of the second sequence forming the beginning of the first sequence;

(b) translating the first sequence of data samples in a first direction and the second sequence of data samples in a second direction opposite of the first direction such that samples 1 ... (n/2) of the first sequence positionly overlie samples n ... (n/2)+1 of the second sequence;

(c) comparing the positions of the data samples at the end of the first and second sequences, respectively, with the position of each data sample in said second and first sequences, respectively, to produce a pair of output signals each having a plurality of data points, each of said data points representative of a midpoint position between the compared data samples;

(d) addition a new data sample to said first sequence and shifting the data samples in the first and second sequences by one position;

(e) comparing the positions of the data samples at the beginning of the first and second sequences, respectively, with the position of each data sample in said second and first sequences, respectively, to produce a second pair of output signals;

(f) repeating steps (c)-(e) for additonal data samples; and (g) summing the data points at each midpoint position generated in step (e) and subtracting the data points at each midpoint position generated in step (c) to form a histogram.

15. The method for processing as described in claim 14 wherein the step of converting comprises converting said signal from an analog form to a digital form.

16. The method for processing as described in claim 14 further including the steps of sampling said sequence of data samples to produce a sequence of peak data samples.

17. The method for processing as described in claim 14 wherein said histogram has symmetrical patterns when said signal is periodic.

18. The method for processing as described in claim 17 wherein said symmetrical patterns are separated by a distance equaling the period of the fundamental frequency of said periodic signal.

19. The method for processing as described in claim 14 wherein said midpoint position is determined by calculating the distance between said compared data samples and dividing by two.

20. The method for processing as described in claim 14 wherein said data samples are compared only when the amplitudes of said data samples are within a predetermined range.

21. The method for processing as described in claim 20 wherein said data points have a value proportional to the amplitude of said compared data samples.

* * * * *

UNITED STATES PATENT AND TRADEMARK OFFICE
CERTIFICATE OF CORRECTION

PATENT NO. : 4,672,667

DATED : June 9, 1987

INVENTOR(S) : Brian L. Scott, et al.

It is certified that error appears in the above-identified patent and that said Letters Patent is hereby corrected as shown below:

Column 1, line 51, change "historgram" to --histogram--.
Column 1, line 57, change "historgram" to --histogram--.
Column 2, line 12, after "new" insert --data--.
Column 2, line 66, after "move" insert --in--.
Column 4, line 9, change "peak-pick" to --peak-picked--.
Column 4, line 21, change "calculated. The" to --calculated, the--.
Column 5, line 2, after "convolver" insert --between--.
Column 5, line 2, change "position" to --positions--.
Column 5, line 4, change "position" to --positions--.
Column 5, line 34, change "a" to --the--.
Column 5, line 35, change first occurrence "the" to --a--.
Column 5, line 62, change "FIG 3" to --FIG 3d"
Column 6, line 55, after "the" insert --positions of the--.
Column 6, line 58, change "correlator" to --convolver--.
Column 6, line 66, after "all" insert --the--.
Column 7, line 43, change "determined" to --determine--.

Signed and Sealed this

Twenty-seventh Day of October, 1987

Attest:

DONALD J. QUIGG

*Attesting Officer*       *Commissioner of Patents and Trademarks*